United States Patent
Li et al.

(10) Patent No.: US 9,876,610 B2
(45) Date of Patent: Jan. 23, 2018

(54) METHOD, TERMINAL, AND BASE STATION FOR RETRANSMITTING MESSAGE

(71) Applicant: Huawei Technologies Co., Ltd., Shenzhen (CN)

(72) Inventors: Yue Li, Shenzhen (CN); Song Zhu, Beijing (CN); Xin Xiong, Beijing (CN); Yongxia Lv, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 386 days.

(21) Appl. No.: 14/562,684

(22) Filed: Dec. 6, 2014

(65) Prior Publication Data
US 2015/0092740 A1 Apr. 2, 2015

Related U.S. Application Data

(63) Continuation of application No. PCT/CN2012/076520, filed on Jun. 6, 2012.

(51) Int. Cl.
*H04L 1/08* (2006.01)
*H04L 5/00* (2006.01)
(Continued)

(52) U.S. Cl.
CPC .............. *H04L 1/08* (2013.01); *H04L 1/1861* (2013.01); *H04L 1/1887* (2013.01);
(Continued)

(58) Field of Classification Search
CPC ....... H04L 1/1887; H04L 1/1861; H04L 1/08; H04L 1/1896; H04L 5/0053; H04L 5/0005
See application file for complete search history.

(56) References Cited

U.S. PATENT DOCUMENTS 7,643,535 B1   1/2010  Wiss et al.
2009/0011786 A1* 1/2009  Lee ..................... H04W 52/50
                                                      455/522
(Continued)

FOREIGN PATENT DOCUMENTS

CN      101052140 A    10/2007
CN      101562836 A    10/2009
(Continued)

OTHER PUBLICATIONS

Huawei et al., "Bandwidth Reduction for Low Cost MTC UE and Text Proposal," 3GPP TSG RAN WG1#68, R1-120051, Feb. 6-10, 2012, 9 pages.
(Continued)

*Primary Examiner* — Redentor Pasia
(74) *Attorney, Agent, or Firm* — Slater Matsil, LLP

(57) ABSTRACT

Embodiments of the present invention disclose a method for retransmitting a message, mainly including notifying, by a terminal, a base station that the terminal is a narrowband terminal when sending a random access preamble to the base station; and when the base station subsequently detects that an error occurs to a message 3 sent by the terminal, instructing, by the base station, through a message 3 retransmission indicator, the terminal to retransmit the message 3, or retransmitting, by the terminal, the message 3 to the base station in a manner for actively retransmitting the message 3.

20 Claims, 4 Drawing Sheets

(51) Int. Cl.
*H04L 1/18* (2006.01)
*H04W 74/08* (2009.01)

(52) U.S. Cl.
CPC .......... *H04L 1/1896* (2013.01); *H04L 5/0005* (2013.01); *H04L 5/0053* (2013.01); *H04W 74/0833* (2013.01)

(56) References Cited

U.S. PATENT DOCUMENTS

| | | | |
|---|---|---|---|
| 2010/0275086 A1 | 10/2010 | Bergquist et al. | |
| 2012/0178482 A1* | 7/2012 | Seo | H04W 56/00 455/501 |
| 2013/0235821 A1* | 9/2013 | Chen | H04W 72/0406 370/329 |
| 2014/0133433 A1* | 5/2014 | Ahn | H04W 74/002 370/329 |

FOREIGN PATENT DOCUMENTS

| | | |
|---|---|---|
| CN | 101695196 A | 4/2010 |
| CN | 102388562 A | 3/2012 |
| WO | 2011068367 A2 | 6/2011 |
| WO | 2013049520 A1 | 4/2013 |

OTHER PUBLICATIONS

LG Electronics, "Cost Saving Analysis for Bandwidth Reduction," 3GPP TSG RAN WG1 Meeting #68, R1-120456, Feb. 6-10, 2012, 7 pages.

Philips et al., "Control of HARQ for RACH Message 3," 3GPP TSG-RAN WG2#62, R2-082452, May 5-9, 2008, 5 pages.

"3rd Generation Partnership Project; Technical Specification Group Radio Access Network; Evolved Universal Terrestrial Radio Access (E-UTRA); Physical layer procedures (Release 10)," 3GPP TS 36.213 V10.4.0, Dec. 2011, 125 pages.

Nokia Siemens Networks, "Definition of Relative Narrowband TX Power Indicator," 3GPP TSG-RAN Meeting #53, R1-082184, Change Request, May 5-9, 2008, 4 pages.

Samsung, "Impact of Bandwidth Reduction on Low-Cost MTC UE Procedures," 3GPP TSG RAN WG1 #68bis, R1-121654, Mar. 26-30, 2012, Jeju, Korea, 3 pages.

* cited by examiner

METHOD, TERMINAL, AND BASE STATION FOR RETRANSMITTING MESSAGE

CROSS-REFERENCE TO RELATED APPLICATIONS

This application is a continuation of International Application No. PCT/CN2012/076520, filed on Jun. 6, 2012, which is hereby incorporated by reference in its entirety.

TECHNICAL FIELD

The present invention relates to a random access process and, in particular embodiments, to a method, a terminal, and a base station for retransmitting a message.

BACKGROUND

In a 3GPP (The 3rd Generation Partnership Project) conference, an operator puts forward a concept of a narrowband terminal supporting a low bandwidth (such as: a bandwidth of 1.4M). Because a bandwidth supported by a narrowband terminal is low, a production cost of the terminal can be substantially reduced, so that the narrowband terminal has a good application prospect in an M2M (Machine to Machine, Internet of things).

However, in the prior art, there is still no good manner to support a narrowband terminal in retransmitting a message 3 in a random access process. The message 3 is data that is sent in a random access process by a terminal to a base station by using authorization information in a random access response when the terminal receives the random access response that is sent by the base station and is effective for the terminal.

SUMMARY

A technical problem to be solved in embodiments of the present invention is to provide a method, a terminal, and a base station for retransmitting a message, so that a narrowband terminal can retransmit a message 3 in a random access process.

In one aspect, an embodiment of the present invention provides a method for retransmitting a message, including: notifying, by a terminal, a base station that the terminal is a narrowband terminal when sending a random access preamble to the base station; receiving, by the terminal, a first random access response that is sent by the base station to the terminal according to the random access preamble, and sending a message 3 to the base station according to the first random access response; and receiving, by the terminal, a message 3 retransmission indicator for the narrowband terminal from the base station, and retransmitting the message 3 to the base station according to the message 3 retransmission indicator, or retransmitting, by the terminal, the message 3 to the base station in an active retransmission manner after sending the message 3 to the base station according to the first random access response.

In one aspect, an embodiment of the present invention further provides a method for retransmitting a message 3, including: analyzing, by a base station, a random access preamble received from a terminal, and knowing that the terminal is a narrowband terminal; sending, by the base station, a first random access response to the terminal according to the random access preamble; and receiving, by the base station, a message 3 that is sent by the terminal according to the first random access response, and when it is detected that an error occurs to the message 3, sending a message 3 retransmission indicator for the narrowband terminal to the terminal, or receiving the message 3 that is retransmitted by the terminal in an active retransmission manner.

In one aspect, an embodiment of the present invention further provides a terminal, including: a processing unit, configured to notify a base station that the terminal is a narrowband terminal when sending a random access preamble to the base station; and a receiving unit, configured to receive a first random access response that is sent by the base station according to the random access preamble sent by the terminal, where the processing unit is further configured to send a message 3 to the base station according to the first random access response received by the receiving unit; the receiving unit is further configured to receive a message 3 retransmission indicator for the narrowband terminal from the base station; and the processing unit is further configured to retransmit the message 3 to the base station according to the message 3 retransmission indicator for the narrowband terminal received by the receiving unit, or retransmit the message 3 to the base station in an active retransmission manner after sending the message 3.

In one aspect, an embodiment of the present invention further provides a base station, including: a receiving unit, configured to receive a random access preamble from the terminal; an analyzing unit, configured to analyze the random access preamble received by the receiving unit from a terminal, and know that the terminal is a narrowband terminal; a sending unit, configured to send a first random access response to the terminal according to the random access preamble received by the receiving unit, where the receiving unit is further configured to receive a message 3 that is sent by the terminal to the base station according to the first random access response; and a detecting unit, configured to detect the message 3 received by the receiving unit, where the sending unit is configured to, when the detecting unit detects that an error occurs to the message 3, send a message 3 retransmission indicator for the narrowband terminal to the terminal; or, the receiving unit is configured to, when the detecting unit detects that an error occurs to the message 3, receive the message 3 that is retransmitted by the terminal to the base station in an active retransmission manner.

By implementing the embodiments of the present invention, the following beneficial effects are achieved.

In the prior art, when a narrowband terminal performs random access, because a base station does not know that the terminal is a narrowband terminal, the base station still schedules the narrowband terminal to retransmit a message 3 in a conventional manner (a manner for a wideband terminal) when an error occurs to the message 3 received by the base station and uploaded by the terminal, thereby causing a problem that the narrowband terminal cannot normally retransmit the message 3 because the narrowband terminal fails to receive a message 3 retransmission indicator for the wideband terminal. In the embodiments of the present invention, when a random access preamble is sent to a base station, the base station is notified that a terminal is a narrowband terminal. Therefore, when the base station subsequently detects that an error occurs to a message 3 uploaded by the terminal, the base station can schedule, in a manner for the narrowband terminal to retransmit the message 3, the terminal to retransmit the message 3, or the terminal directly retransmits the message 3 to the base station in an active retransmission manner. Because in the foregoing the base station has known that the terminal is the narrowband terminal, the base station does not wrongly consider that a mess occurs to terminal transmission. In this way, in the embodiments of the present invention, a narrowband terminal retransmits a message 3, and a success rate of a random access of the narrowband terminal is increased.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
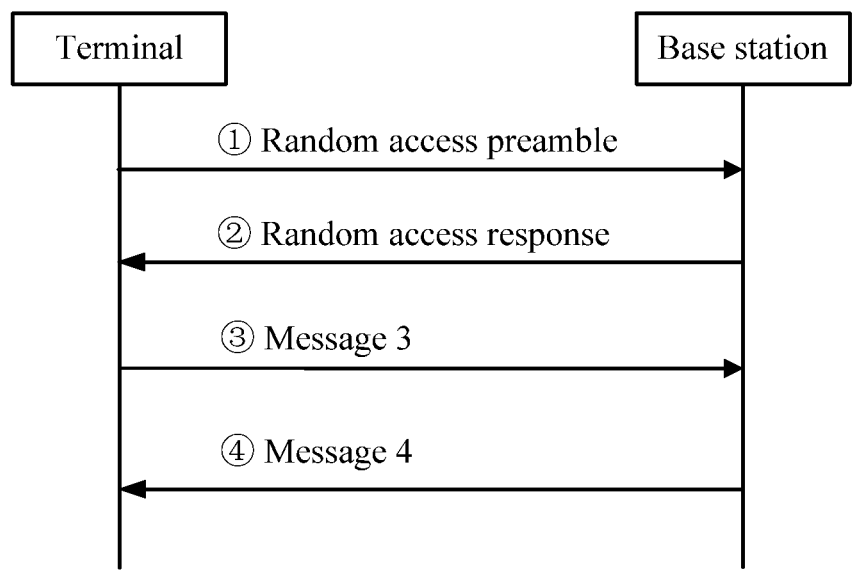
FIG. 1 is a schematic flow chart of a random access process.

First, a random access process is described. As shown in FIG. 1, the random access process includes the following steps.

Process 1: A terminal first determines a random access preamble to be sent to a base station, then selects a PRACH (Physical Random Access Channel) resource for sending the random access preamble, and then executes sending. The random access preamble herein is called Message 1 or Msg1 for short.

Process 2: After the terminal sends the random access preamble, the terminal attempts to receive a random access response from the base station in an RAR (Random Access Response, random access response) receiving window. The random access response herein is called Message 2 (message 2), Msg2 for short. Generally, the random access response generally includes: a random access preamble identifier, UL (Uplink, uplink) authorization, a temporary C-RNTI (Cell Radio Network Temporary Identifier, cell radio network temporary identifier), and a time alignment command.

Process 3: If the terminal receives a random access response effective for the terminal, the terminal processes information in the received random access response separately, that is, the terminal applies a time alignment command and stores a temporary C-RNTI. In addition, UL authorization is used for sending, to the base station, data stored in a buffer of the terminal or data newly generated. Herein, the data sent by using the UL authorization is generally called Message 3 (message 3), Msg3 for short.

Process 4: After the terminal sends the data by using the UL authorization included in the random access response, the terminal attempts to receive a PDCCH (Physical Downlink Control Channel, physical downlink control channel) so as to receive a specified message. Herein, if the terminal normally receives the PDCCH before timeout, it is considered that the random access process is performed in a normal manner, and the random access process is ended. The message received in Process 4 is generally called Message 4 (message 4), Msg4 for short.

In the foregoing Process 3, after the base station receives the message 3 sent by the terminal, if the base station performs error detection on the message 3 and finds that an error occurs to the message 3, the base station generally schedules, through a PDCCH or a PHICH (Physical Hybrid ARQ Indicator Channel, physical hybrid ARQ indicator channel), the terminal to retransmit the message 3. When hybrid automatic retransmission is adopted, even though no error occurs to the message 3, the base station still sends an acknowledgement (ACK) indicator to the terminal through the PHICH. Because the base station does not know that the terminal is a narrowband terminal or a wideband terminal in a random access process, the base station schedules, by adopting the PDCCH or the PHICH, the terminal to retransmit the message 3. Because the narrowband terminal cannot receive the PDCCH or the PHICH, supporting of a message 3 retransmission mechanism of the narrowband terminal fails to be implemented.

Then, a message 3 retransmission process for a narrowband terminal is described.

The following terminal or narrowband terminal refers to user equipments of various types, such as a mobile communication terminal, a UE (user equipment), an ME (mobile equipment), and other apparatuses supporting wireless communication technologies of various types. The base station in the following includes but is not limited to: a node B (Node B), an eNB (evolved Node B, evolved base station), and an access point. The embodiment of the present invention relates to a process that a narrowband terminal randomly accesses a base station, and in particular, to a message 3 retransmission mechanism suitable for a narrowband terminal in an access process.

Figure 2:
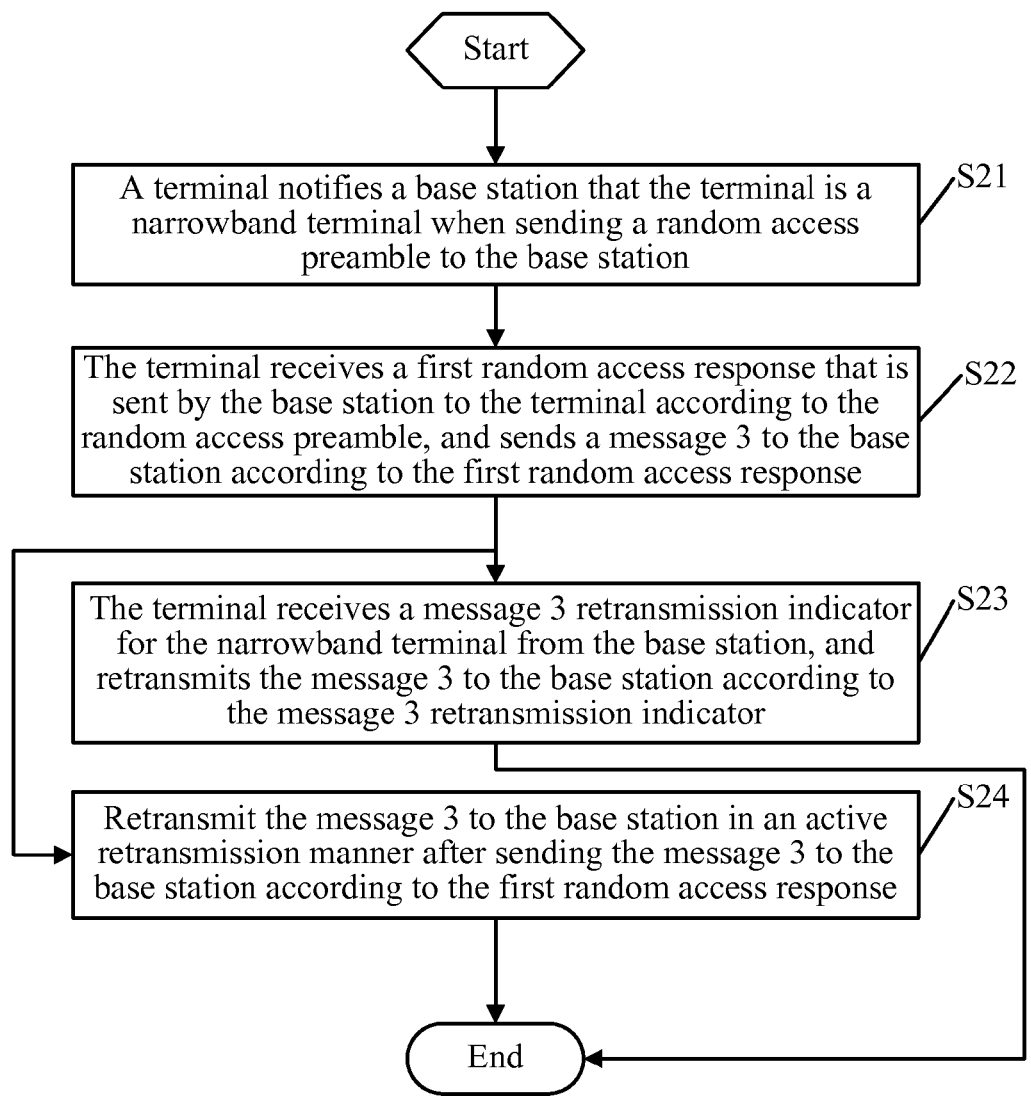
FIG. 2 is a schematic flow chart of a method for retransmitting a message according to a first embodiment of the present invention.

Referring to FIG. 2, FIG. 2 is a schematic flow chart of a method for retransmitting a message according to a first embodiment of the present invention. In a method procedure shown in FIG. 2, a message 3 retransmission process is described from a terminal side, which includes the following steps.

Step S21: A terminal notifies a base station that the terminal is a narrowband terminal when sending a random access preamble to the base station.

Two manners for notifying the base station that the terminal is a narrowband terminal are introduced herein.

One manner is that the terminal sends the random access preamble to the base station by using time-frequency resource that indicates a narrowband characteristic. Herein, a special time-frequency resource is introduced for the narrowband terminal. When the terminal sends the random access preamble by using the special time-frequency resource, it is considered that the terminal has a narrowband characteristic, that is, the terminal is the narrowband terminal. The time-frequency resource herein may be PRACH resource.

The other manner is that the terminal sends, to the base station, a random access preamble that indicates a narrowband characteristic. Herein, random access preambles are grouped in advance. One of the preamble groups is defined as a special preamble group that indicates a narrowband characteristic. When the terminal uses any random access preamble in the special preamble group, and sends the random access preamble to the base station, it is considered that the terminal has a narrowband characteristic, that is, the terminal is the narrowband terminal.

It should be noted that the foregoing two implementation manners may be performed at the same time, that is, the terminal selects, from the special preamble group that indicates a narrowband characteristic, a random access preamble to be sent to the base station, and then sends the selected random access preamble by using specific time-frequency resource that can indicate the narrowband characteristic.

It should be noted that the special time-frequency resource and/or the random access preamble in the special preamble group is used to transmit the narrowband characteristic of the terminal to the base station, that is, to notify the base station that the terminal is the narrowband terminal, and is generally dedicated for the narrowband terminal. However, if a wideband terminal uses the special time-frequency resource and/or the random access preamble in the special preamble group, an effect that the base station is notified that the terminal is a narrowband terminal may also be achieved.

Step S22: The terminal receives a first random access response that is sent by the base station to the terminal according to the random access preamble sent in step S11, and sends a message 3 to the base station according to the first random access response.

A process herein is the same as Process 2 shown in FIG. 1, and details are not described herein again.

Step S23: The terminal receives a message 3 retransmission indicator for the narrowband terminal from the base station for retransmitting the message 3, and retransmits the message 3 to the base station according to the message 3 retransmission indicator. Or, step S24 may be performed.

Step S24: The terminal retransmits the message 3 to the base station in an active retransmission manner after sending the message 3 to the base station according to the first random access response in step S22.

The message 3 retransmission indicator for the narrowband terminal refers to a message 3 retransmission indicator that is sent by the base station through a narrowband channel (a channel for a narrowband terminal to receive control information), for example: in step S23, the terminal may receive the message 3 retransmission indicator that is sent by the base station through an e-PDCCH (narrowband physical downlink control channel), and retransmit the message 3 according to the message 3 retransmission indicator. Because the e-PDCCH is a narrowband channel, the narrowband terminal can normally receive information that is sent through the e-PDCCH.

The message 3 retransmission indicator for the narrowband terminal may also refer to a message 3 retransmission indicator sent by the base station in another manner that can be received by the narrowband terminal. For example, in step S23, the terminal may also receive a second random access response that includes the message 3 retransmission indicator and is sent by the base station, and retransmit the message 3 according to the message 3 retransmission indicator. When the second random access response is adopted to send the message 3 retransmission indicator, a RAR Window for Retransmission (narrowband RAR window for retransmission) needs to be defined for the base station to transmit the message 3 retransmission indicator to the narrowband terminal through the second random access response. Generally, after sending the message 3 to the base station according to the first random access response, the terminal immediately enters the narrowband RAR window for retransmission, and monitors the second random access response from the base station in the narrowband RAR window for retransmission. It should be noted herein that if the narrowband terminal receives a message 4 effective for the narrowband terminal from the base station at a certain moment in the narrowband RAR window for retransmission or the narrowband RAR window for retransmission times out, the terminal stops monitoring the second random access response. Further, if an HARQ (Hybrid Automatic Retransmission Request, hybrid automatic retransmission request) is performed between the terminal and the base station, some reserved bits in the second random access response may be used as an indicator of new data for HARQ combination of the terminal.

In step S24, after sending the message 3 to the base station for the first time (that is, step S22), the terminal does not need to be scheduled by the base station, but actively retransmits the message 3 to the base station for one or more times, that is, "blind retransmission". In this case, the terminal does not know for which time the message 3 sent to the base station is correctly received by the base station. However, by retransmitting the message 3 repeatedly, the base station can finally receive a correct message 3. In this manner, the number of retransmission times of the terminal may be limited, that is, there is a concept of the maximum number of retransmission times. The maximum number of the retransmission times may be transmitted by the base station to the terminal through an SIB (System Information Block, system information block) message or the first random access response. It should be noted that in the prior art, after the terminal sends the message 3 to the base station for the first time, a timer is started. If the message 4 is still not received after the timer times out, it is considered that random access fails. Then, in the embodiment of the present invention, after the "blind retransmission" is used, starting time of the timer should be deferred until the last message 3 is retransmitted.

In the embodiment of the present invention, a narrowband characteristic of a terminal is first transmitted to a base station, so that when the base station detects that an error occurs to a message 3, the base station may transmit a message 3 retransmission indicator to the terminal through an e-PDCCH that is suitable for a narrowband terminal to receive information or through a second random access response, thereby avoiding a situation that the terminal fails to receive the message 3 retransmission indicator in a PDCCH or a PHICH when the PDCCH or the PHICH is used to schedule the terminal to retransmit the message 3, and ensuring that the narrowband terminal retransmits the message 3. Moreover, in the embodiment of the present invention, a "blind retransmission" manner may also be adopted to implement retransmission of the message 3. Because the terminal has already reported to the base station that the terminal has a narrowband characteristic, the base station knows that the terminal can adopt the "blind retransmission" manner to retransmit the message 3. Therefore, even though the base station receives multiple messages 3 without an indicator, it is not considered that a mess of terminal transmission occurs.

Figure 3:
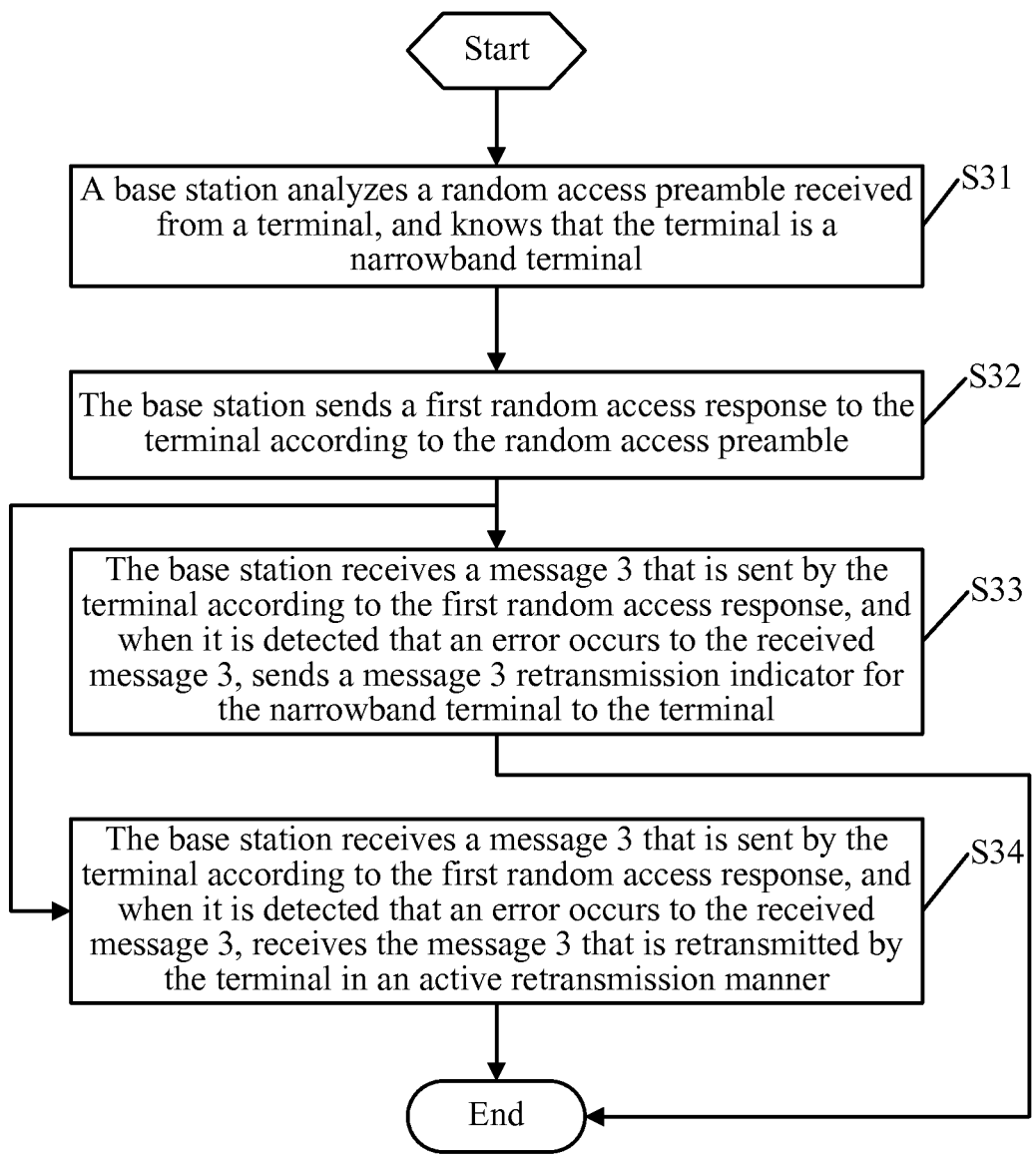
FIG. 3 is a schematic flow chart of a method for retransmitting a message according to a second embodiment of the present invention.

Referring to FIG. 3, FIG. 3 is a schematic flow chart of a method for retransmitting a message according to a second embodiment of the present invention. In the embodiment shown in FIG. 3, retransmission of a message 3 is described from a base station side, which includes:

Step S31: A base station analyzes a random access preamble received from a terminal, and knows that the terminal is a narrowband terminal.

Corresponding to the two manners for the terminal to notify the base station that the terminal is a narrowband terminal in step S21, there are two analyzing manners in step S31 for the base station to know that the terminal is a narrowband terminal.

One manner is that the base station analyzes time-frequency resource used by the random access preamble, and when the used time-frequency resource is time-frequency resource that indicate a narrowband characteristic, knows that the terminal is the narrowband terminal. The time-frequency resource herein are special time-frequency resource introduced for the narrowband terminal. When it is analyzed that the terminal uses these special time-frequency resource, it is considered that the terminal has a narrowband characteristic. The time-frequency resource may be PRACH resource.

The other manner is that the base station analyzes the random access preamble, and when the random access preamble is a random access preamble that indicates a narrowband characteristic, knows that the terminal is the narrowband terminal. Herein, random access preambles may be grouped in advance. One of the preamble groups is defined as a special preamble group that indicates a narrowband characteristic. When the received random receiving preamble is any random access preamble in the special preamble group, it is considered that the terminal has a narrowband characteristic, that is, the terminal is the narrowband terminal.

It should be noted that the foregoing two analyzing manners may be performed at the same time. As long as any analysis result indicates that the terminal has a narrowband characteristic, it is known that the terminal is the narrowband terminal.

It should be noted that the foregoing special time-frequency resource and/or the random access preamble in the special preamble group is dedicated for the narrowband terminal. However, if a wideband terminal uses the foregoing special time-frequency resource and/or the random access preamble in the special preamble group, it may also be analyzed the fact that the wideband terminal has a narrowband characteristic.

Step S32: The base station sends a first random access response to the terminal according to the random access preamble received in step S31.

Step S33: The base station receives a message 3 that is sent by the terminal according to the first random access response, and when it is detected that an error occurs to the received message 3, sends a message 3 retransmission indicator for the narrowband terminal to the terminal. Or, step S34 may be performed.

Step S34: The base station receives a message 3 that is sent by the terminal according to the first random access response, and when it is detected that an error occurs to the received message 3, receives the message 3 that is retransmitted by the terminal in an active retransmission manner.

Step S33 and step S34 are two manners for performing error correction on the message 3.

In step S33, the base station may send the message 3 retransmission indicator to the terminal through an e-PDCCH. Because the e-PDCCH is a narrowband channel, the message 3 retransmission indicator sent through the e-PDCCH can be received correctly by the narrowband terminal. Or, the base station may send a second random access response including the message 3 retransmission indicator to the terminal.

In step S34, when the base station detects that an error occurs to the message 3, the base station does not need to perform scheduling. Because the base station knows that the terminal may actively retransmit the message 3, the base station only needs to wait to receive the message 3 uploaded by the terminal and perform combination. It should be noted that once receiving a correct message 3, the base station stops receiving other messages 3 uploaded by the terminal. In this implementation manner, the base station may also limit the number of retransmission times of the narrowband terminal, that is, the maximum number of retransmission times needs to be indicated. Specifically, the maximum number of the retransmission times may be indicated to the terminal through an SIB message or the first random access response, that is, the SIB message or the first random access response is extended to carry the maximum number of the retransmission times and is sent to the terminal. It should be noted that the SIB message is sent by the base station in a broadcast manner, and the SIB message is effective for all narrowband terminals, while the first random access response may be for a specified narrowband terminal. Therefore, when the first random access response is adopted to indicate the maximum number of the retransmission times, dynamic configuration may be performed for different narrowband terminals.

In the embodiment of the present invention, after a base station knows a fact that a terminal is a narrowband terminal by analyzing a received random access preamble from the terminal, when the base station detects that an error occurs to a message 3, the base station may transmit a message 3 retransmission indicator to the terminal through an e-PDCCH that is suitable for a narrowband terminal to receive information or through a second random access response, thereby avoiding s situation that a retransmission failure occurs because the terminal fails to receive the message 3 retransmission indicator in a PDCCH or a PHICH when the PDCCH or the PHICH is used to schedule the terminal to retransmit the message 3, and ensuring that the narrowband terminal retransmits the message 3. Moreover, in this embodiment, the base station can further wait for the message 3 sent by the terminal in a "blind retransmission" manner.

A device according to an embodiment of the present invention is described in the following.

Figure 4:
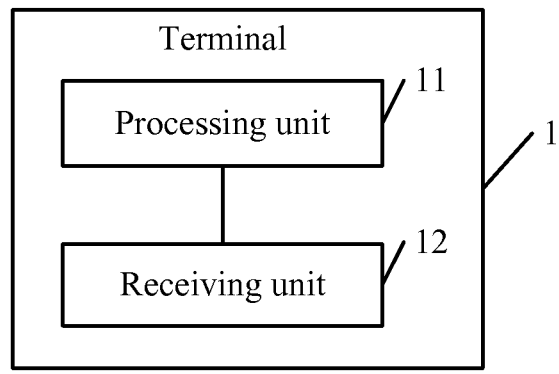
FIG. 4 is a schematic structural diagram of a terminal according to an embodiment of the present invention.

Referring to FIG. 4, FIG. 4 is a schematic structural diagram of a terminal for retransmitting a message 3 according to an embodiment of the present invention. The terminal 1 is a narrowband terminal, which includes:

A processing unit 11 is configured to notify a base station that the terminal 1 is a narrowband terminal when sending a random access preamble to the base station.

Two manners for notifying the base station that the terminal 1 is a narrowband terminal are introduced herein.

One manner is that the processing unit 11 sends the random access preamble to the base station by using time-frequency resource that indicates a narrowband characteristic. Herein, a special time-frequency resource is introduced for the narrowband terminal. When the processing unit 11 sends the random access preamble by using the special time-frequency resource, it is considered that the terminal 1 has a narrowband characteristic, that is, the terminal 1 is the narrowband terminal. The time-frequency resource herein may be PRACH resource.

The other manner is that the processing unit 11 sends, to the base station, a random access preamble that indicates a narrowband characteristic. Herein, random access preambles are grouped in advance. One of the preamble groups is defined as a special preamble group that indicates a narrowband characteristic. When the processing unit 11 uses any random access preamble in the special preamble group, and sends the random access preamble to the base station, it is considered that the terminal 1 has a narrowband characteristic, that is, the terminal 1 is the narrowband terminal.

It should be noted that the foregoing two implementation manners may be performed at the same time, that is, the processing unit 11 selects, from the special preamble group that indicates a narrowband characteristic, a random access preamble to be sent to the base station, and then sends the selected random access preamble by using specific time-frequency resource that can indicate the narrowband characteristic.

It should be noted that the special time-frequency resource and/or the random access preamble in the special preamble group is used to transmit the narrowband characteristic of the terminal to the base station, and is generally dedicated for the narrowband terminal. However, if a wideband terminal uses the special time-frequency resource and/or the random access preamble in the special preamble group, an effect that the base station is notified that the terminal has a narrowband characteristic may also be achieved, that is, the base station considers that the terminal is a narrowband terminal, unless there is an evidence to prove that the terminal is a wideband terminal actually.

A receiving unit 12 is configured to receive a first random access response that is sent by the base station according to the random access preamble sent by the processing unit 11.

The processing unit 11 is configured to send a message 3 to the base station according to the first random access response received by the receiving unit 12.

The receiving unit 12 is configured to receive a message 3 retransmission indicator for the narrowband terminal from the base station. Generally, when the base station detects that an error occurs to the message 3, the base station sends the message 3 retransmission indicator to the terminal.

The receiving unit 12 may receive the message 3 retransmission indicator that is sent by the base station through an e-PDCCH (narrowband physical downlink control channel). Because the e-PDCCH is a narrowband channel, a message 3 retransmitting unit 12 can normally receive information that is sent through the e-PDCCH.

The receiving unit 12 may also receive a second random access response that includes the message 3 retransmission indicator and is sent by the base station. When the second random access response is adopted to send the message 3 retransmission indicator, a RAR Window for Retransmission (narrowband RAR window for retransmission) needs to be defined for the base station to transmit the message 3 retransmission indicator to the narrowband terminal through the second random access response. Generally, after sending the message 3 to the base station according to the first random access response, the processing unit 11 immediately enters the narrowband RAR window for retransmission, and the receiving unit 12 monitors the second random access response from the base station in the narrowband RAR window for retransmission. It should be noted herein that if a message 4 effective for it from the base station at a certain moment is received in the narrowband RAR window for retransmission or the narrowband RAR window for retransmission times out, the monitoring of the second random access response is stopped. Further, if an HARQ (Hybrid Automatic Retransmission Request, hybrid automatic retransmission request) is performed between the terminal and the base station, some reserved bits in the second random access response may be used as an indicator of new data for HARQ combination of the terminal.

The processing unit 11 is configured to retransmit the message 3 to the base station according to the message 3 retransmission indicator for the narrowband terminal received by the receiving unit 12.

In this embodiment, the terminal 1 may also retransmit the message 3 in an active retransmission manner. In this manner:

The processing unit 11 is configured to retransmit the message 3 to the base station in the active retransmission manner after sending the message 3 to the base station.

In this implementation manner, after sending the message 3 to the base station for the first time, the processing unit 11 does not need to be scheduled by the base station, but actively retransmits the message 3 to the base station for one or more times, that is, "blind retransmission". In this case, the processing unit 11 does not know for which time the message 3 sent to the base station is correctly received by the base station. However, by retransmitting the message 3 repeatedly, the base station can finally receive the message 3 correctly. In this implementation manner, the number of retransmission times of the processing unit 11 may be limited, that is, there is a concept of the maximum number of retransmission times. The maximum number of the retransmission times may be transmitted by the base station to the terminal through an SIB (System Information Block, system information block) message or the first random access response. It should be noted that in the prior art, after the message 3 is sent to the base station for the first time, a timer is started. If the message 4 is still not received after the timer times out, it is considered that random access fails. Then, in the embodiment of the present invention, after the "blind retransmission" is used, starting time of the timer should be deferred until the last message 3 is retransmitted.

In the embodiment of the present invention, a narrowband characteristic of a terminal is first transmitted to a base station, so that when the base station detects that an error occurs to a message 3, the base station may transmit a message 3 retransmission indicator to the terminal through an e-PDCCH that is suitable for a narrowband terminal to receive information or through a second random access response, thereby avoiding a situation that the terminal fails to receive the message 3 retransmission indicator in a PDCCH or a PHICH when the PDCCH or the PHICH is used to schedule the terminal to retransmit the message 3, and ensuring that the narrowband terminal retransmits the message 3. Moreover, in the embodiment of the present invention, a "blind retransmission" manner may also be adopted to implement retransmission of the message 3. Because the terminal has already reported to the base station that the terminal has a narrowband characteristic, the base station knows that the terminal can adopt the "blind retransmission" manner to retransmit the message 3. Therefore, even though the base station receives multiple messages 3 without an indicator, it is not considered that a mess of terminal transmission occurs.

Figure 5:
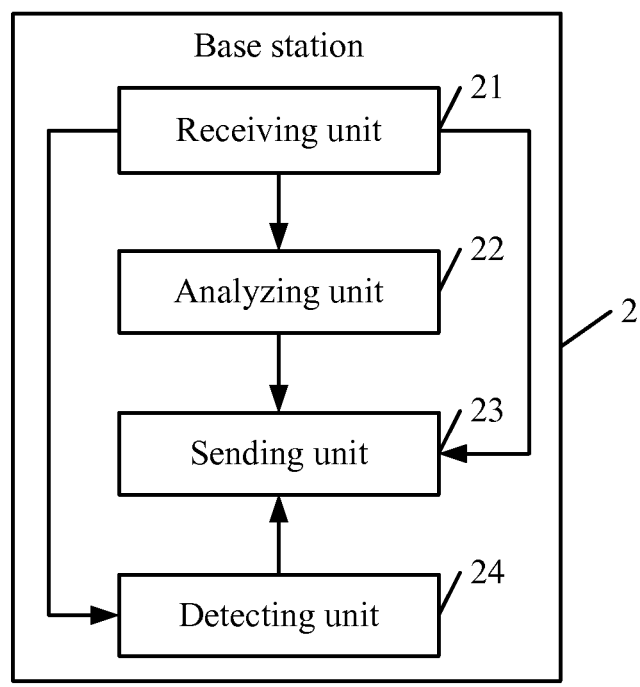
FIG. 5 is a schematic structural diagram of a base station according to an embodiment of the present invention.

Referring to FIG. 5, FIG. 5 is a schematic structural diagram of a base station for retransmitting a message 3 according to an embodiment of the present invention. The base station 2 includes:

A receiving unit 21 is configured to receive a random access preamble from the terminal.

An analyzing unit 22 is configured to analyze the random access preamble received by the receiving unit 21 from a terminal, and know that the terminal is a narrowband terminal.

The following are two analyzing manners:

One manner is that the analyzing unit 22 analyzes time-frequency resource used by the random access preamble, and when the used time-frequency resource is time-frequency resource that indicate a narrowband characteristic, knows that the terminal has a narrowband characteristic, that is, the terminal is the narrowband terminal. The time-frequency resource herein are special time-frequency resource introduced for the narrowband terminal. When it is analyzed that the terminal uses these special time-frequency resource, it is considered that the terminal has a narrowband characteristic. The time-frequency resource may be PRACH resource.

The other manner is that the analyzing unit 22 analyzes the random access preamble, and when the random receiving preamble is a random access preamble that indicates a narrowband characteristic, information that the terminal has a narrowband characteristic is obtained. Random access preambles may be grouped in advance. One of the preamble groups is defined as a special preamble group that indicates a narrowband characteristic. When the received random access preamble is any random access preamble in the special preamble group, it is considered that the terminal has a narrowband characteristic, that is, the terminal is the narrowband terminal.

It should be noted that the foregoing two analyzing manners may be performed at the same time. As long as any analysis result indicates that the terminal has a narrowband characteristic, it is known that the terminal is the narrowband terminal.

It should be noted that the foregoing special time-frequency resource and/or the random access preamble in the special preamble group is dedicated for the narrowband terminal. However, if a wideband terminal uses the foregoing special time-frequency resource and/or the random access preamble in the special preamble group, it is also considered that the wideband terminal has a narrowband characteristic, unless there is an evidence to prove that the terminal actually has a wideband characteristic.

A sending unit 23 is configured to send a first random access response to the terminal according to the random access preamble received by the receiving unit 21.

The receiving unit 21 is configured to receive a message 3 that is sent by the terminal to the base station according to the first random access response.

A detecting unit 24 is configured to detect the message 3 received by the receiving unit 21.

The sending unit 23 is configured to, when the analyzing unit 22 knows that the terminal is the narrowband terminal, and the detecting unit 24 detects that an error occurs to the message 3, send a message 3 retransmission indicator for the narrowband terminal to the terminal.

The sending unit 23 may send the message 3 retransmission indicator to the terminal through an e-PDCCH. Because the e-PDCCH is a narrowband channel, the message 3 retransmission indicator sent through the e-PDCCH can be received correctly by the narrowband terminal. Or, a second random access response including the message 3 retransmission indicator may be sent to the terminal, to implement retransmission indication.

Or, the receiving unit 21 is configured to, when the analyzing unit 22 knows that the terminal is the narrowband terminal, and the detecting unit 24 detects an error occurs to the message 3, receive the message 3 that is retransmitted by the terminal to the base station in an active retransmission manner.

Herein, because the receiving unit 21 knows that the narrowband terminal may retransmit the message 3 in an active retransmission manner, when the detecting unit 24 detects that an error occurs to the message 3, the receiving unit 21 only needs to wait for the message 3 uploaded by terminal. It should be noted that once receiving a correct message 3, the receiving unit 21 stops receiving other messages 3 uploaded by the terminal. In this implementation manner, the base station may also limit the number of retransmission times of the narrowband terminal, that is, the maximum number of retransmission times needs to be indicated. Specifically, the maximum number of the retransmission times may be indicated to the terminal by the sending unit 23 through an SIB message or the first random access response, for example: the SIB message or the first random access response is extended to carry the maximum number of the retransmission times and is sent to the terminal. It should be noted that the SIB message is broadcast, and the SIB message is effective for all narrowband terminals, while the first random access response may be for a specified narrowband terminal. Therefore, when the first random access response is adopted to indicate the maximum number of the retransmission times, the maximum number of the retransmission times may be dynamically configured for different narrowband terminals.

In the embodiment of the present invention, a base station knows that a terminal has a narrowband characteristic by analyzing a received random access preamble from the terminal, so that when the base station detects that an error occurs to a message 3, the base station may transmit a message 3 retransmission indicator to the terminal through an e-PDCCH that is suitable for a narrowband terminal to receive information or through a second random access response, thereby avoiding a situation that a retransmission failure occurs because the terminal fails to receive the message 3 retransmission indicator in a PDCCH or a PHICH when the PDCCH or the PHICH is used to schedule the terminal to retransmit the message 3, and ensuring that the narrowband terminal retransmits the message 3. Moreover, in this embodiment, the base station can further wait for the terminal to retransmit the message 3 in a "blind retransmission" manner.

A person of ordinary skill in the art may understand that all or a part of the procedures of the methods in the foregoing embodiments may be implemented by a computer program instructing relevant hardware. The program may be stored in a computer readable storage medium. When the program runs, the procedures of the methods in the foregoing embodiments are performed. The storage medium may be a magnetic disk, an optical disc, a read-only memory (Read-Only Memory, ROM), or a random access memory (Random Access Memory, RAM).

The foregoing disclosures are merely exemplary embodiments of the present invention, but are not intended to limit the scope of rights of the present invention. A person of ordinary skill in the art may understand all or a part of the procedures for implementing the foregoing embodiments, and equivalent variations made according to the claims of the present invention still fall within the scope covered by the present invention.

What is claimed is:

1. A method for retransmitting a message, the method comprising:

notifying, by a terminal, a base station that the terminal is a narrowband terminal when sending a random access preamble to the base station in a random access process, the terminal lacking an ability to receive signals in a physical downlink control channel (PDCCH) and a physical hybrid automatic retransmission request indicator channel (PHIC);

receiving, by the terminal, a first random access response that is sent by the base station to the terminal according to the random access preamble;

sending, by the terminal, a message 3 to the base station according to the first random access response; and receiving, by the terminal from the base station, a message 3 retransmission indicator in a channel for narrowband terminals excluding the PDCCH and the PHIC, the message 3 retransmission indicator instructing the terminal to retransmit the message 3, and retransmitting, by the terminal, the message 3 to the base station according to the message 3 retransmission indicator, or retransmitting, by the terminal, the message 3 to the base station repeatedly in an active retransmission manner after sending the message 3 to the base station according to the first random access response and before a timer for determining whether the random access process fails is started.

2. The method according to claim 1, wherein notifying the base station that the terminal is a narrowband terminal comprises sending, by the terminal, the random access preamble to the base station by using time-frequency resource that indicates a narrowband characteristic, so as to notify the base station that the terminal is the narrowband terminal; and/or sending, by the terminal, to the base station, a random access preamble that indicates a narrowband characteristic, so as to notify the base station that the terminal is the narrowband terminal.

3. The method according to claim 1, wherein receiving the message 3 retransmission indicator for the narrowband terminal from the base station comprises:

receiving, by the terminal, the message 3 retransmission indicator that is sent by the base station to the terminal through a narrowband physical downlink control channel e-PDCCH; or receiving, by the terminal, a second random access response comprising the message 3 retransmission indicator from the base station.

4. The method according to claim 1, wherein the terminal retransmits the message 3 to the base station in the active retransmission manner and wherein a number of times that the terminal repeatedly retransmits the message 3 does not exceed the maximum number of retransmission times indicated by the base station.

5. The method according to claim 4, wherein the number of the times that the terminal retransmits the message 3 does not exceed the maximum number of the retransmission times that is indicated by the base station through a system information block SIB message or the first random access response.

6. A method for retransmitting a message, the method comprising:

analyzing, by a base station, a random access preamble received from a terminal in a random access procedure to determine that the terminal is a narrowband terminal, the terminal lacking an ability to receive signals in a physical downlink control channel (PDCCH) and a physical hybrid automatic retransmission request indicator channel (PHIC);

sending, by the base station, a first random access response to the terminal according to the random access preamble; and receiving, by the base station, a message 3 that is sent by the terminal according to the first random access response and, when it is detected that an error occurs to the message 3, sending a message 3 retransmission indicator for narrowband terminals to the terminal, the message 3 retransmission indicator instructing the terminal to perform retransmission of the message 3, wherein the message 3 retransmission indicator is sent without using the PDCCH and the PHIC, or receiving the message 3 that is retransmitted by the terminal repeatedly in an active retransmission manner for a number of times during the random access procedure.

7. The method according to claim 6, wherein analyzing the random access preamble received from a terminal to determine that the terminal is a narrowband terminal comprises:

analyzing, by the base station, the random access preamble received from the terminal and, when time-frequency resource used by the random access preamble are time-frequency resource that indicate a narrowband characteristic, determining that the terminal is the narrowband terminal; or analyzing, by the base station, the random access preamble received from the terminal and, when the random access preamble is a random access preamble that indicates a narrowband characteristic, determining that the terminal is the narrowband terminal.

8. The method according to claim 6, wherein sending the message 3 retransmission indicator for the narrowband terminal to the terminal comprises sending the message 3 retransmission indicator to the terminal through a narrowband physical downlink control channel e-PDCCH or sending a second random access response comprising the message 3 retransmission indicator to the terminal.

9. The method according to claim 6, wherein, before receiving the message 3 that is retransmitted by the terminal in an active retransmission manner, the method further comprises indicating, by the base station, the maximum number of retransmission times that the terminal retransmits the message 3 in the active retransmission manner.

10. The method according to claim 9, wherein indicating, by the base station, the maximum number of retransmission times that the terminal retransmits the message 3 in the active retransmission manner comprises indicating, by the base station, the maximum number of the retransmission times of the terminal by sending an SIB message or the first random access response to the terminal, wherein the SIB message or the first random access response carries the maximum number of the retransmission times.

11. A terminal, comprising:

a processor; and a computer-readable storage medium storing instructions to be executed by the processor, such that the processor is programmed to:

notify a base station that the terminal is a narrowband terminal when sending a random access preamble to the base station in a random access process, the narrowband terminal lacking an ability to receive signals in a physical downlink control channel (PDCCH) and a physical hybrid automatic retransmission request indicator channel (PHIC);

receive a first random access response that is sent by the base station according to the random access preamble sent by the terminal;

send a message 3 to the base station according to the received first random access response;

receive, from the base station, a message 3 retransmission indicator in a channel for narrowband terminals excluding the PDCCH and the PHIC, the message 3 retransmission indicator indicating retransmission of the message 3 and being sent by the base station when the base station determines that the terminal is a narrowband terminal; and retransmit the message 3 to the base station according to the message 3 retransmission indicator for narrowband terminals, or retransmit the message 3 to the base station repeatedly in an active retransmission manner after sending the message 3 and before a timer for determining whether the random access process fails is started.

12. The terminal according to claim 11, wherein the processor is programmed to send the random access preamble to the base station by using time-frequency resource that indicates a narrowband characteristic, and/or to send, to the base station, a random access preamble that indicates a narrowband characteristic, so as to notify the base station that the terminal is the narrowband terminal.

13. The terminal according to claim 11, wherein:
the processor is programmed to receive the message 3 retransmission indicator that is sent by the base station to the terminal through a narrowband physical downlink control channel e-PDCCH; or
the processor is programmed to receive a second random access response comprising the message 3 retransmission indicator from the base station.

14. The terminal according to claim 11, wherein the processor is programmed to, when retransmitting the message 3 to the base station in the active retransmission manner, retransmit the message 3 for times, the number of which does not exceed the maximum number of retransmission times indicated by the base station.

15. The terminal according to claim 14, wherein the maximum number of the retransmission times is indicated by the base station through a system information block SIB message or the first random access response.

16. A base station, comprising:
a processor; and
a computer-readable storage medium storing instructions to be executed by the processor, such that the processor is programmed to:
receive a random access preamble from a terminal in a random access procedure, the terminal being a narrowband terminal and lacking an ability to receive signals in a physical downlink control channel (PDCCH) and a physical hybrid automatic retransmission request indicator channel (PHIC);
analyze the random access preamble received from the terminal to determine whether the terminal is a narrowband terminal;
send a first random access response to the terminal according to the random access preamble;
receive a message 3 that is sent by the terminal to the base station according to the first random access response;
detect the received message 3; and
send a message 3 retransmission indicator for narrowband terminals to the terminal when detecting that an error occurs to the message 3 and when determining that the terminal is a narrowband terminal, the message 3 retransmission indicator instructing retransmission of the message 3, wherein the message 3 retransmission indicator is sent in a narrowband channel without using the PDCCH and the PHIC, or receive the message 3 that is retransmitted by the terminal to the base station repeatedly in an active retransmission manner when determining that the terminal is a narrowband terminal and detecting that an error occurs to the message 3, wherein the base station stops receiving the message 3 repeatedly retransmitted by the terminal for a number of times during the random access procedure.

17. The base station according to claim 16, wherein:
the processor is programmed to analyze time-frequency resource used by the random access preamble that is received from the terminal, and when the used time-frequency resource are time-frequency resource that indicate a narrowband characteristic, determine that the terminal is the narrowband terminal; or
the processor is programmed to analyze the random access preamble received from the terminal, and when the random access preamble is a random access preamble that indicates a narrowband characteristic, determine that the terminal is the narrowband terminal.

18. The base station according to claim 16, wherein the processor is programmed to send the message 3 retransmission indicator to the terminal through a narrowband physical downlink control channel e-PDCCH, or to send a second random access response comprising the message 3 retransmission indicator to the terminal.

19. The base station according to claim 16, wherein the processor is programmed to, before receiving the message 3 that is retransmitted by the terminal in the active retransmission manner, indicate the maximum number of retransmission times that the terminal retransmits the message 3 in the active retransmission manner.

20. The base station according to claim 19, wherein the processor is programmed to indicate the maximum number of the retransmission times of the terminal by sending an SIB message or the first random access response to the terminal, wherein the SIB message or the first random access response carries the maximum number of the retransmission times.

* * * * *